United States Patent
Wu et al.

(10) Patent No.: US 11,945,606 B1
(45) Date of Patent: Apr. 2, 2024

(54) ELECTRIC PROPULSION BASED SPACECRAFT PROPULSION SYSTEMS AND METHODS UTILIZING MULTIPLE PROPELLANTS

(71) Applicant: Ball Aerospace & Technologies Corp., Boulder, CO (US)

(72) Inventors: Gordon C. Wu, Melbourne, FL (US); Derek Chan, Boulder, CO (US); William D. Deininger, Lafayette, CO (US)

(73) Assignee: Ball Aerospace & Technologies Corp., Boulder, CO (US)

( * ) Notice: Subject to any disclaimer, the term of this patent is extended or adjusted under 35 U.S.C. 154(b) by 0 days.

(21) Appl. No.: 17/967,941

(22) Filed: Oct. 18, 2022

Related U.S. Application Data

(60) Provisional application No. 63/257,255, filed on Oct. 19, 2021.

(51) Int. Cl.
*B64G 1/40* (2006.01)
*B64G 1/26* (2006.01)

(52) U.S. Cl.
CPC ............ *B64G 1/402* (2013.01); *B64G 1/26* (2013.01); *B64G 1/405* (2013.01); *B64G 1/411* (2023.08); *B64G 1/413* (2023.08); *B64G 1/415* (2023.08)

(58) Field of Classification Search
CPC ........... F02K 9/50; B64G 1/402; B64G 1/405; B64G 1/26; B64G 1/415
See application file for complete search history.

(56) References Cited

U.S. PATENT DOCUMENTS

| | | | |
|---|---|---|---|
| 3,350,886 A | 11/1967 | Feraud et al. | |
| 4,609,169 A | 9/1986 | Schweickert et al. | |
| 4,880,185 A | 11/1989 | Apfel | |
| 4,923,152 A | 5/1990 | Barkats | |
| 5,026,259 A | 6/1991 | Whitehead et al. | |

(Continued)

FOREIGN PATENT DOCUMENTS

| | | |
|---|---|---|
| EP | 2530018 | 7/2014 |
| EP | 3689758 | 3/2021 |
| WO | WO 2006/056716 | 6/2006 |

OTHER PUBLICATIONS

U.S. Appl. No. 16/871,144, filed May 11, 2020, Wu et al.

(Continued)

*Primary Examiner* — Kyle Robert Thomas
(74) *Attorney, Agent, or Firm* — Sheridan Ross P.C.

(57) ABSTRACT

Spacecraft propulsion systems and methods featuring a first storage tank containing a metallic propellant and a second storage tank containing a non-metallic propellant are provided. A selected one of the metallic propellant and the non-metallic propellant is supplied to an electric propulsion thruster, depending on an operational mode of the spacecraft. The metallic propellant is stored at a relatively high density, while the non-metallic propellant is stored at a lower density than the metallic propellant. Moreover, the non-metallic propellant is preferably utilized to produce thrust through the electric propulsion thruster during operational maneuvers, while the metallic propellant is reserved for producing thrust through the electric propulsion thruster during end-of-life, such as deorbiting, maneuvers.

20 Claims, 4 Drawing Sheets

(56) References Cited

U.S. PATENT DOCUMENTS

| | | | |
|---|---|---|---|
| 5,203,844 A | 4/1993 | Leonard | |
| 5,305,970 A | 4/1994 | Porter et al. | |
| 5,651,515 A * | 7/1997 | Saccoccia | B64G 1/406 |
| | | | 244/171.1 |
| 5,823,478 A | 10/1998 | Dunn | |
| 5,927,653 A | 7/1999 | Mueller et al. | |
| 5,961,074 A | 10/1999 | Dunn | |
| 6,036,143 A * | 3/2000 | Biber | F03H 1/00 |
| | | | 244/172.7 |
| 6,089,510 A * | 7/2000 | Villani | B64G 1/36 |
| | | | 244/166 |
| 6,119,985 A | 9/2000 | Clapp et al. | |
| 6,299,107 B1 | 10/2001 | Kong et al. | |
| 6,301,876 B1 * | 10/2001 | Back | F03H 1/0012 |
| | | | 62/48.1 |
| 6,314,978 B1 | 11/2001 | Lanning et al. | |
| 6,457,306 B1 | 10/2002 | Abel et al. | |
| 6,834,493 B2 | 12/2004 | Hashimoto et al. | |
| 6,971,228 B2 | 12/2005 | Dujarric | |
| 7,762,058 B2 * | 7/2010 | Pederson | F02K 9/50 |
| | | | 60/251 |
| 7,762,498 B1 | 7/2010 | Henderson et al. | |
| 8,074,935 B2 | 12/2011 | Gryniewski et al. | |
| 8,181,911 B1 | 5/2012 | Gryniewski et al. | |
| 8,393,582 B1 | 3/2013 | Kutter et al. | |
| 8,899,527 B2 | 12/2014 | Allen et al. | |
| 9,108,747 B2 | 8/2015 | Roberts et al. | |
| 9,145,216 B2 | 9/2015 | Gascon et al. | |
| 9,249,758 B2 | 2/2016 | Conrardy | |
| 9,260,206 B2 | 2/2016 | Allen et al. | |
| 9,334,855 B1 * | 5/2016 | Hruby | F03H 1/00 |
| 9,446,862 B2 | 9/2016 | Barthoulot et al. | |
| 9,567,111 B2 | 2/2017 | Roberts et al. | |
| 9,676,499 B2 | 6/2017 | Myers et al. | |
| 9,688,422 B2 | 6/2017 | Roberts et al. | |
| 10,180,118 B2 * | 1/2019 | Berg | F02K 9/52 |
| 10,589,879 B2 | 3/2020 | Baldwin et al. | |
| 10,604,281 B2 | 3/2020 | Raven et al. | |
| 10,738,739 B2 | 8/2020 | Bahn | |
| 10,844,808 B2 | 11/2020 | Bahn et al. | |
| 10,926,892 B1 | 2/2021 | Wu et al. | |
| 10,926,982 B2 | 2/2021 | Lindberg | |
| 11,021,273 B1 | 6/2021 | Wu et al. | |
| 11,059,608 B2 | 7/2021 | Holder et al. | |
| 11,060,482 B2 | 7/2021 | Kwak et al. | |
| 11,346,306 B1 | 5/2022 | Wu et al. | |
| 2002/0139902 A1 | 10/2002 | Valentian | |
| 2002/0179776 A1 | 12/2002 | Mueller et al. | |
| 2003/0075645 A1 | 4/2003 | Randolph et al. | |
| 2003/0131583 A1 | 7/2003 | Kudija, Jr. et al. | |
| 2003/0173469 A1 | 9/2003 | Kudija, Jr. et al. | |
| 2003/0209005 A1 | 11/2003 | Fenn | |
| 2004/0031885 A1 | 2/2004 | D'Ausilio et al. | |
| 2004/0035982 A1 | 2/2004 | Capozzi et al. | |
| 2004/0061028 A1 | 4/2004 | Salvatore et al. | |
| 2004/0226279 A1 | 11/2004 | Fenn | |
| 2004/0245406 A1 | 12/2004 | Guiheen et al. | |
| 2004/0245407 A1 | 12/2004 | D'Ausilio et al. | |
| 2005/0034447 A1 | 2/2005 | Joshi et al. | |
| 2005/0151022 A1 | 7/2005 | D'Ausilio et al. | |
| 2005/0205717 A1 | 9/2005 | Salvatore et al. | |
| 2007/0040067 A1 | 2/2007 | D'Ausilio et al. | |
| 2007/0108349 A1 | 5/2007 | D'Ausilio et al. | |
| 2007/0114334 A1 | 5/2007 | D'Ausilio et al. | |
| 2007/0153960 A1 | 7/2007 | D'Ausilio et al. | |
| 2007/0153961 A1 | 7/2007 | D'Ausilio et al. | |
| 2007/0153962 A1 | 7/2007 | D'Ausilio et al. | |
| 2008/0011903 A1 | 1/2008 | D'Ausilio et al. | |
| 2008/0027595 A1 | 1/2008 | Fowler et al. | |
| 2008/0029651 A1 | 2/2008 | D'Ausilio et al. | |
| 2008/0142639 A1 | 6/2008 | Jallade | |
| 2008/0256924 A1 | 10/2008 | Pederson et al. | |
| 2008/0265098 A1 | 10/2008 | Connelly et al. | |
| 2008/0296436 A1 | 12/2008 | D'Ausilio et al. | |
| 2009/0020650 A1 | 1/2009 | Ho | |
| 2009/0078829 A1 | 3/2009 | Ho et al. | |
| 2009/0242704 A1 | 10/2009 | D'Ausilio et al. | |
| 2009/0299553 A1 | 12/2009 | Hope | |
| 2009/0313967 A1 | 12/2009 | Joshi et al. | |
| 2009/0320974 A1 | 12/2009 | Joshi et al. | |
| 2010/0180443 A1 | 7/2010 | Joshi et al. | |
| 2011/0144835 A1 | 6/2011 | Ho | |
| 2011/0180670 A1 | 7/2011 | D'Ausilio et al. | |
| 2012/0241355 A1 | 9/2012 | Tuttle et al. | |
| 2012/0241459 A1 | 9/2012 | Tuttle | |
| 2012/0325972 A1 | 12/2012 | Gryniewski et al. | |
| 2013/0313370 A1 | 11/2013 | Rakers | |
| 2014/0032092 A1 | 1/2014 | Vu | |
| 2014/0365043 A1 | 12/2014 | Vu | |
| 2014/0373507 A1 | 12/2014 | Soulier et al. | |
| 2015/0021439 A1 | 1/2015 | Duchemin et al. | |
| 2016/0200457 A1 | 7/2016 | Droppers | |
| 2016/0273524 A1 | 9/2016 | Keidar et al. | |
| 2016/0333826 A1 | 11/2016 | Tsay et al. | |
| 2016/0368624 A1 | 12/2016 | Hruby et al. | |
| 2017/0283095 A1 | 10/2017 | Koehler et al. | |
| 2017/0284339 A1 | 10/2017 | Koehler et al. | |
| 2017/0361951 A1 | 12/2017 | Walker | |
| 2017/0363044 A1 | 12/2017 | Rhodes | |
| 2017/0370353 A1 | 12/2017 | Keidar et al. | |
| 2018/0148197 A1 | 5/2018 | Halsband et al. | |
| 2018/0186476 A1 | 7/2018 | Poncet et al. | |
| 2018/0327118 A1 | 11/2018 | Ganapathy et al. | |
| 2018/0370659 A1 | 12/2018 | Keidar et al. | |
| 2019/0077523 A1 | 3/2019 | Faber | |
| 2019/0144140 A1 | 5/2019 | Hosoda et al. | |
| 2019/0168606 A1 | 6/2019 | Faber et al. | |
| 2020/0003159 A1 | 1/2020 | Karp et al. | |
| 2020/0024003 A1 | 1/2020 | Koehler et al. | |
| 2020/0283174 A1 | 9/2020 | Kokorich et al. | |
| 2020/0377237 A1 * | 12/2020 | Hanson | B64G 1/402 |
| 2020/0407084 A1 | 12/2020 | Shashurin et al. | |

OTHER PUBLICATIONS

U.S. Appl. No. 17/740,111, filed May 9, 2022, Wu et al.
"Control valves," Wikipedia, Nov. 18, 2009, 2 pages.
Chato "Technologies for Refueling Spacecraft On-Orbit," NASA, Nov. 2000, NASA/TM-2000-210476, 14 pages.
Devereaux et al. "Development Testing of a New Bipropellant Propulsion System for the GMP-T Spacecraft," 46th AIAA/ASME/SAE/ASEE Joint Propulsion Conference & Exhibit, Jul. 25-28, 2010, AIAA 2010-6649, 13 pages.
Gorin "Next Generation Fill and Drain/Vent Valve," 41st AIAA/ASME/SAE/ASEE Joint Propulsion Conference & Exhibit, Jul. 10-13, 2005, AIAA 2005-3731, 5 pages.

* cited by examiner

ELECTRIC PROPULSION BASED SPACECRAFT PROPULSION SYSTEMS AND METHODS UTILIZING MULTIPLE PROPELLANTS

CROSS-REFERENCE TO RELATED APPLICATIONS

This application claims the benefit of U.S. Provisional Patent Application Ser. No. 63/257,255, filed Oct. 19, 2021, the entire disclosure of which is hereby incorporated herein by reference.

FIELD

Provided are systems and methods that selectively supply an electric propulsion thruster in a spacecraft with metallic or non-metallic propellant.

BACKGROUND

Spacecraft and satellites (hereinafter referred to collectively as spacecraft) often incorporate thrusters for propulsion and attitude control. Thrusters can include chemical propulsion systems that operate by combusting a chemical or metallic propellant in a combustion chamber to produce an exhaust gas that is ejected through a nozzle, thereby creating thrust in a desired direction. Thrusters can also include cold gas thruster systems, which eject pressurized gas through a nozzle. As still another example, thrusters can include electric propulsion systems that are supplied with either an inert gas or a metallic propellant.

Thrusters that are supplied with a metallic propellant can produce high levels of thrust, and the propellant is generally much denser and is stored at much lower pressures than the gases used in cold gas thruster systems or in electric propulsion systems supplied with an inert gas. However, metallic propellants tend to stick to surfaces after they have been ejected from the thruster. Accordingly, metallic propellants are not suitable for missions that involve the use of instruments that would be affected by the propellant residue, such as instruments in the form of sensitive optics. Cold gas thrusters or electric thrusters supplied with a non-metallic gas as a propellant are generally free of the contamination issues caused by thrusters supplied with a metallic propellant. However, the use of a non-metallic gas as a propellant typically provides lower levels of thrust, and such gases are much less dense than metallic propellants. Accordingly, a non-metallic gas must be stored at a high pressure in a relatively large vessel in order to support missions of even modest durations.

Due to the various advantages and disadvantages of metallic and non-metallic propellants, spacecraft have been configured with multiple, separate thruster systems. For example, a relatively high thrust, metallic propellant based thruster system can be included for use early in the mission to reach a desired orbit and/or for deorbiting the spacecraft when it reaches its end of life. In addition, a relatively lower thrust but contamination free non-metallic based thruster system can be included for use in making attitude or orbital adjustments after the spacecraft has operationally deployed optical or other sensitive instruments. However, the inclusion of multiple, separate thruster systems adds volume, mass, complexity, and cost to the spacecraft.

SUMMARY

Embodiments of the present disclosure are directed to propulsion systems that include an electric propulsion thruster capable of producing thrust using either a metallic propellant or a non-metallic propellant. Embodiments of the present disclosure are further directed to methods in which certain spacecraft maneuvers are performed by supplying a metallic propellant to the electric propulsion thruster, and certain other spacecraft maneuvers are performed by supplying a non-metallic propellant to the electric propulsion thruster.

Systems in accordance with embodiments of the present disclosure include one or more metallic propellant storage tanks or vessels capable of holding a metallic propellant at a relatively high density and at a relatively low pressure. The metallic propellant storage tank can include or be associated with a heater and/or a pressurant system for dispensing the metallic propellant. Systems in accordance with embodiments of the present disclosure further include one or more non-metallic propellant storage tanks capable of holding a non-metallic propellant at a relatively low density and at relatively high pressures. The non-metallic propellant storage tank generally stores the non-metallic propellant as a gas or super critical fluid. In addition to the storage vessels, systems in accordance with embodiments of the present disclosure include one or more electric propulsion thrusters. Each electric propulsion thruster is selectively supplied with either the metallic propellant from a metallic propellant storage vessel, or a non-metallic propellant from a non-metallic storage vessel.

Methods in accordance with embodiments of the present disclosure include storing a metallic propellant in a metallic propellant storage vessel at a first pressure, and storing a non-metallic propellant in a non-metallic propellant storage vessel at a second pressure that is greater than the first pressure. During an operation included in a first set of operations, metallic propellant from the metallic propellant storage vessel is supplied to a first electric propulsion thruster to produce thrust. During an operation included in a second set of operations, non-metallic propellant from the non-metallic propellant storage vessel is supplied to the first electric propulsion thruster to produce thrust.

Additional features and advantages of embodiments of the disclosed systems and methods will become more readily apparent from the following description, particularly when taken together with the accompanying drawings.

DETAILED DESCRIPTION

Figure 1:
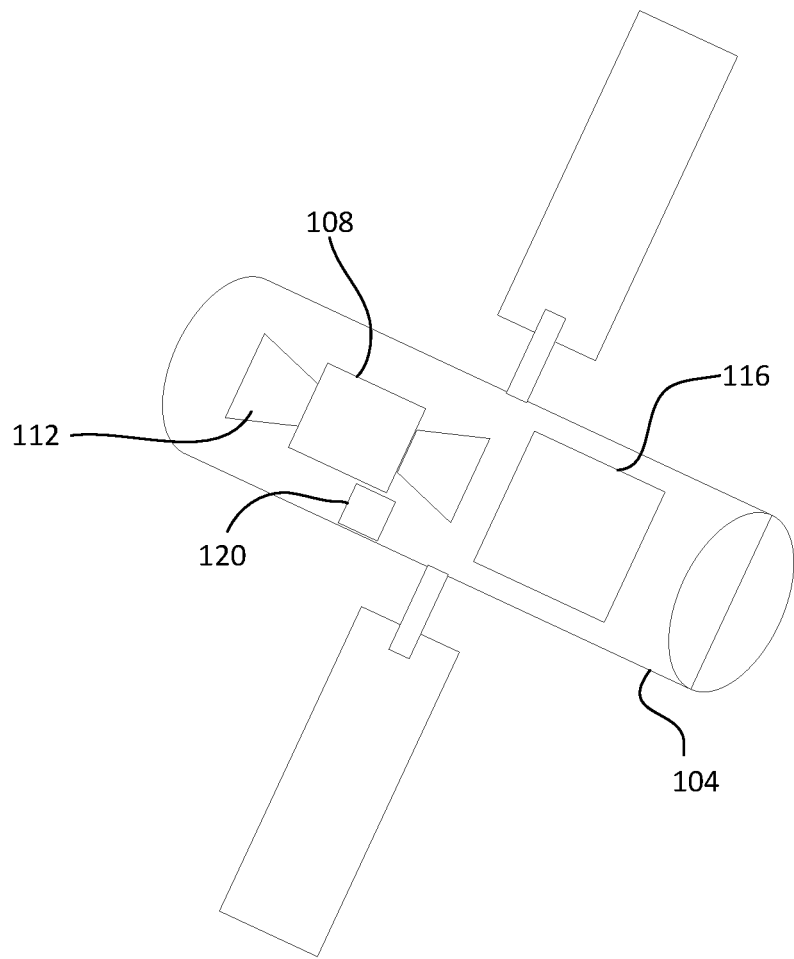
FIG. 1 depicts a spacecraft incorporating a propulsion system in accordance with embodiments of the present disclosure in an exemplary operating scenario.

FIG. 1 depicts a spacecraft 104 incorporating a propulsion system 108 in accordance with embodiments of the present disclosure in an exemplary operating scenario. As discussed in greater detail elsewhere herein, the propulsion system 108 includes one or more electric propulsion (EP) thrusters 112, and is configured to supply an included electric propulsion thruster 112 with either a metallic or a non-metallic propellant. In addition, the spacecraft 104 can include an instrument 116. As an example, but without limitation, the instrument 116 may be an optical or other instrument that, at least when the instrument 116 is in an operational configuration, can become damaged, inoperable, partially inoperable, or otherwise adversely affected by an electric propulsion thruster 112 that expels a metallic propellant. In accordance with embodiments of the present disclosure, the propulsion system 108 is configured to supply a non-metallic propellant to the electric propulsion thruster 112, at least while the instrument 116 might be damaged by use of a metallic propellant, and to optionally provide a metallic propellant to the electric propulsion thruster 112 while the instrument 116 is stowed or while damage to the instrument 116 is not a concern, for example during operations to deorbit the spacecraft 104. The spacecraft 104 can also include a control system 120 that is operable to control the propulsion system 108, the instrument 116, and/or other elements of the spacecraft 104. The control system 120 can operate autonomously, for example through the execution of programming by an included processor or controller; semi-autonomously, through execution of programming by an included processor in combination with instructions received through a communication interface or user input; or under the control of an external authority providing instructions through a communication interface or user input. In accordance with at least some embodiments of the present disclosure, the control system 120 is divided into multiple parts, for example with portions provided as part of the propulsion system 108, and other portions provided as part of the instrument 116.

Figure 2:
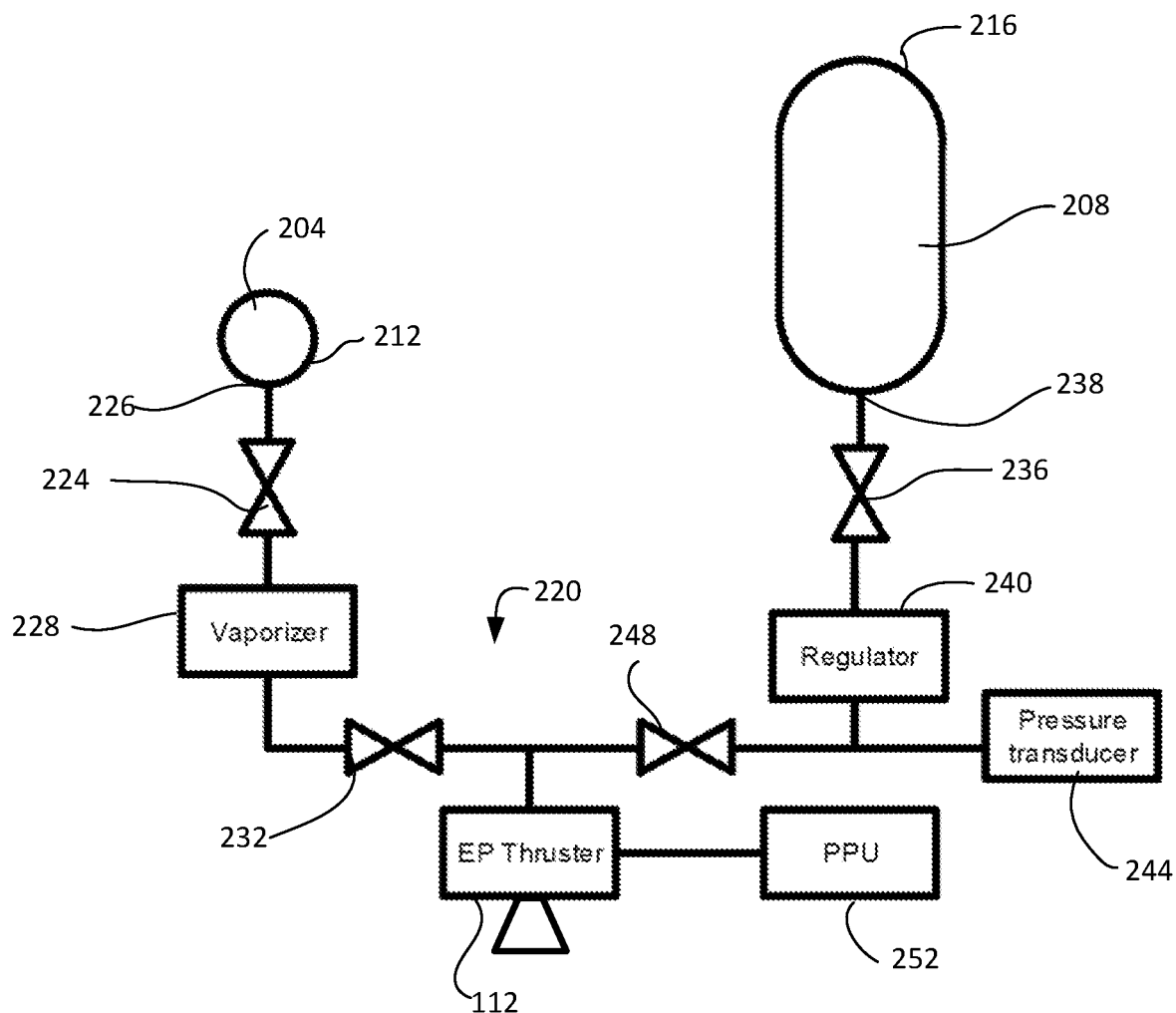
FIG. 2 is a block diagram depicting an electric propulsion system in accordance with embodiments of the present disclosure.

FIG. 2 depicts elements of a propulsion system 108 configured to supply either a metallic 204 or a non-metallic 208 propellant to an electric propulsion thruster 112 in accordance with embodiments of the present disclosure. As can be appreciated by one of skill in the art, an electric propulsion (EP) thruster 112 produces thrust by using electrical power to generate an electrical charge or magnetic field that accelerates an ionized propellant 204 or 208. In accordance with embodiments of the present disclosure, during operations to move or adjust the attitude of a spacecraft 104 carrying the propulsion system 108, the propulsion system 108 supplies the electric propulsion thruster 112 with either the metallic propellant 204 or a non-metallic propellant 208. As discussed elsewhere herein, whether the metallic propellant 204 or the non-metallic propellant 208 is supplied to the electric propulsion thruster 112 can depend on operational considerations of the spacecraft 104 or of an instrument 116 carried by the spacecraft 104.

The metallic propellant 204 is stored in a metallic propellant storage tank or vessel 212 at a density that is relatively high, at least as compared to the non-metallic propellant 208, and a pressure that is relatively low, at least as compared to the non-metallic propellant 208. For example, the metallic propellant 204 can be stored in the storage tank 212 as a solid or a liquid. The metallic propellant tank 212 can include a propellant management device, a heater system, or capillary wick structure in which surface tension is used to expel metallic propellant 204 from the storage tank 212 in a low gravity environment. In accordance with further embodiments of the present disclosure, the metallic propellant tank 212 includes an internal barrier or bladder, alone or in combination with a pressurant, that pressurizes the metallic propellant 204. As can be appreciated by one of skill in the art after consideration of the present disclosure, examples of a metallic propellant 204 include, but are not limited to, mercury, cesium, iodine, and indium.

The non-metallic propellant 208 is stored in a non-metallic propellant storage tank or vessel 216 at a density that is relatively low, at least as compared to the metallic propellant 204, and at a pressure that is relatively high, at least as compared to the metallic propellant 204. In accordance with embodiments of the present disclosure, the non-metallic propellant 208 can be stored in the storage tank 216 as a gas, a high pressure fluid, or a super critical fluid. The non-metallic propellant tank 216 can include a high pressure aluminum or composite gas cylinder type tank. As can be appreciated by one of skill in the art after consideration of the present disclosure, examples of a non-metallic propellant 208 include, but are not limited to, krypton and xenon.

The propulsion system 108 includes a propellant supply network or fluid management system 220 that includes a variety of conduits, valves, and other components to selectively supply a desired propellant 204 or 208 to the EP thruster 112, for example according to commands received from the control system 120. In the illustrated embodiment, a metallic propellant 204 portion of the supply network 220 includes a first metallic propellant supply valve 224 that can be closed to disable or prevent a flow of the metallic propellant 204 from an outlet 226 of the metallic propellant storage tank 212, or opened to allow such a flow. A vaporizer or heater 228 can also be provided as part of the metallic propellant 204 portion of the supply network 220. The vaporizer 228 generally functions to liquify and/or gasify the metallic propellant 204 for supply to the EP thruster 112. Accordingly, in addition to including a vaporization chamber or section positioned downstream of the metallic propellant supply valve 224, it should be appreciated that the vaporizer 228 can include heating elements or features that extend from and including the metallic propellant storage tank 212 to all portions of the supply network 220 that carry or are supplied with the metallic propellant 204, at least while the EP thruster 112 is operated to produce thrust using the metallic propellant 204. A second metallic propellant supply valve 232 can be disposed between the chamber of the vaporizer 228 and the EP thruster 112. In addition to being capable of controlling a supply of the metallic propellant 204 to the EP thruster 112, the second metallic propellant supply valve 232 can be closed during a supply of the non-metallic propellant 208 to the EP thruster 112, to prevent high pressure gas from being introduced to the vaporizer 228 or other components of the metallic propellant 204 portion of the supply network 220.

A non-metallic propellant 208 portion of the supply network 220 can include a first non-metallic propellant supply valve 236 that can be closed to disable or prevent a flow of the non-metallic propellant 208 from an outlet 238 of the non-metallic propellant storage tank 216 or opened to allow such a flow. A regulator 240 can be provided downstream of the non-metallic propellant supply valve 236, to regulate the pressure of the non-metallic propellant 208 supplied to other portions of the supply network 220. In addition, a pressure transducer 244 can be provided to provide a signal indicating the pressure of the non-metallic propellant 208 downstream of the regulator 240. A second non-metallic propellant supply valve 248 can be provided between the regulator 240 and the EP thruster 112. In addition to being capable of controlling a supply of the non-metallic propellant 208 to the EP thruster 112, the second non-metallic propellant supply valve 248 can be closed during a supply of the metallic propellant 204 to the EP thruster 112, to prevent liquid or vaporized metal from backflowing into the regulator 240 and other components of the non-metallic propellant 208 portion of the supply network 220.

As can be appreciated by one of skill in the art after consideration of the present disclosure, a propulsion system 108 can operate the EP thruster 112 to produce thrust by accelerating particles supplied as either a metallic 204 or a non-metallic 208 propellant. A power processing unit 252 can be provided to control the EP thruster 112. More particularly, the power processing unit 252 can selectively provide electrical power to the EP thruster 112, and in particular can selectively operate the EP thruster 112 to produce thrust. In accordance with embodiments of the present disclosure, the power processing unit 252 operates in accordance with commands received from the control system 120.

Figure 3:
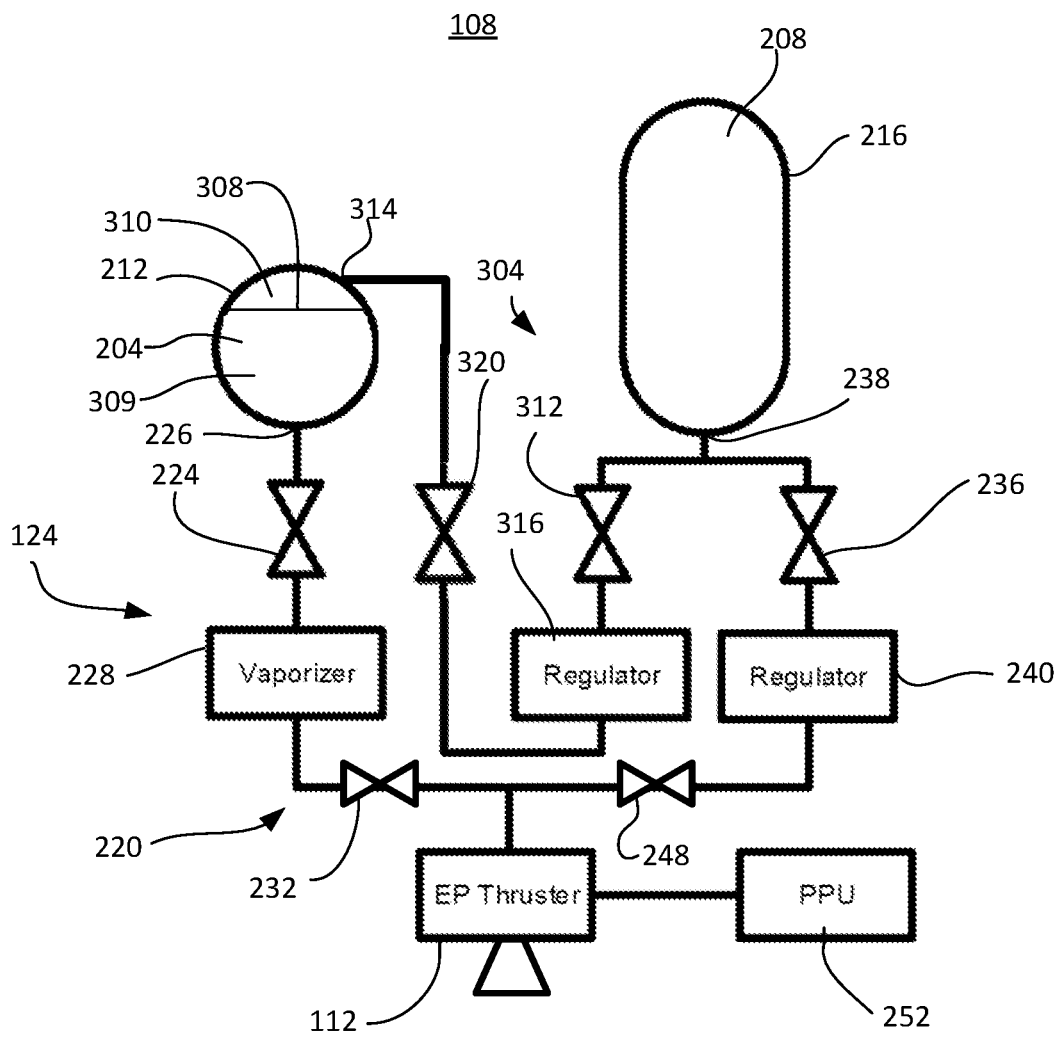
FIG. 3 is a block diagram depicting an electric propulsion system in accordance with other embodiments of the present disclosure.

With reference not to FIG. 3, a propulsion system 108 in accordance with further embodiments of the present disclosure is illustrated. The embodiment of the propulsion system 108 disclosed in connection with FIG. 3 can include some or all of the components included in other embodiments, including the embodiment of the propulsion system 108 discussed in connection with FIG. 2. In particular, the propulsion system 108 includes a metallic propellant 204 stored in a metallic propellant storage tank 212, a non-metallic propellant 208 stored in a non-metallic propellant storage tank 216, an EP thruster 112, a propellant supply network 220, and a power processing unit 252. The propulsion system 108 in this embodiment differs from the embodiment of FIG. 2 in that it additionally includes a pressurization network 304, which selectively places the volume of non-metallic propellant 208 in the non-metallic propellant storage tank 216 in communication with the volume of metallic propellant 204 in the metallic propellant storage tank 212, directly or by acting against a first storage tank diaphragm or barrier 308. If provided, the first storage tank barrier 308 divides the first storage tank 212 into a first chamber 309, containing the metallic propellant 204, and a second chamber 310, containing a portion of the non-metallic propellant 208, acting as a pressurant. Accordingly, the non-metallic propellant 208 can be supplied to either the EP thruster 112 to produce thrust, or to the metallic propellant storage tank 212 to promote a supply of metallic propellant 204 to the EP thruster 112 when the EP thruster 112 is using the metallic propellant 204 to produce thrust.

More particularly, the pressurization network 304 can include a pressurization supply valve 312 to selectively place the non-metallic propellant storage tank 216 in communication with the remainder of the pressurization network 304 through a pressurization gas inlet 314. A pressurization network regulator 316 can be included to control the amount of pressure supplied to the metallic propellant storage tank 212 via the pressurization gas inlet 314. In addition, a backflow prevention valve 320 can be included to prevent a flow of metallic propellant 204 from the metallic propellant storage tank 212 to the pressurization network regulator 316, for instance where the metallic propellant storage tank 212 does not include an interior barrier 308. Accordingly, when the pressurization network 304 is configured to pressurize the metallic propellant 204 by opening the pressurization supply 312 and backflow prevention valves 320.

Figure 4:
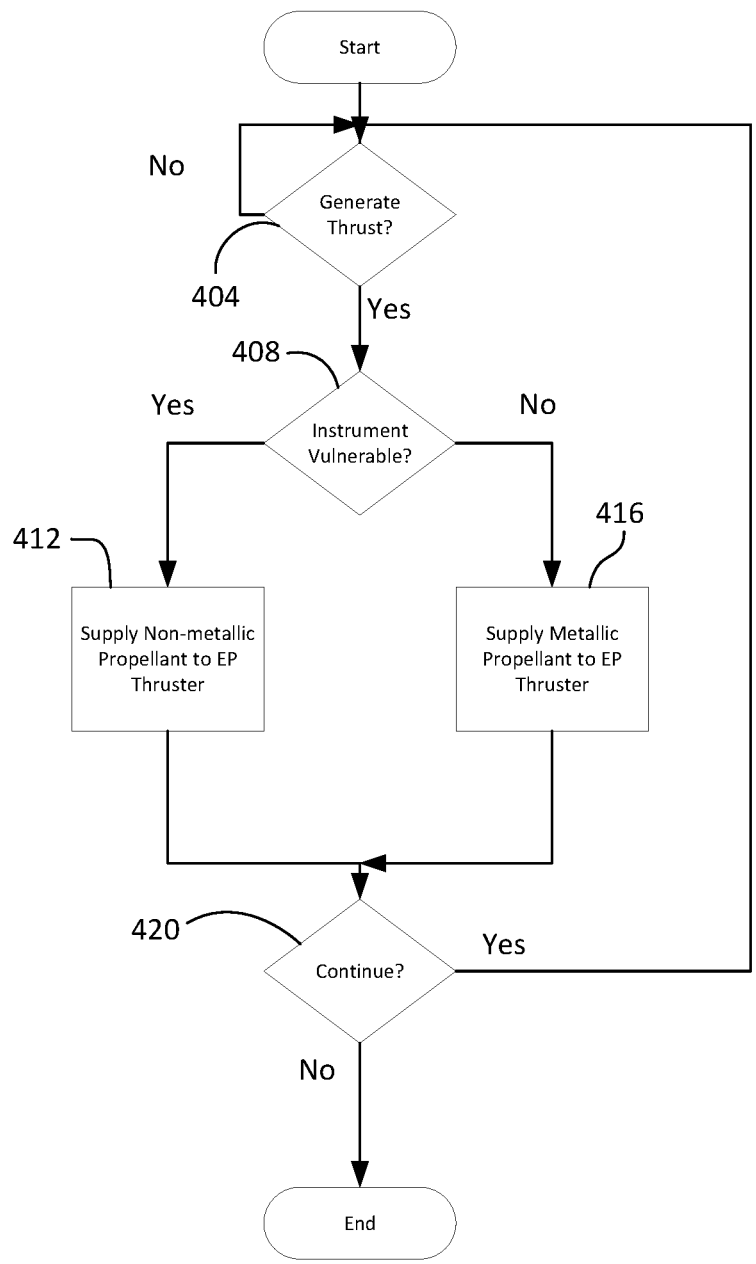
FIG. 4 is a flowchart illustrating aspects of a method for providing and operating an electric propulsion system in accordance with embodiments of the present disclosure.

As depicted in FIG. 4, methods in accordance with embodiments of the present disclosure include determining whether or not a propulsion system 108 of a spacecraft 104 is to be operated to generate thrust through an included electric propulsion thruster 112 (step 404). Until a command to generate thrust is received, the process can idle at step 404. In response to receiving a command to generate thrust, a determination as to the operational status of the spacecraft 104 and its included systems is made. In particular, a determination as to whether an instrument 116 carried by the spacecraft 104 that is sensitive to the use of a metallic propellant 204 is in a vulnerable state can be made (step 408). For example, certain optical instruments can be damaged by metallic propellants. Accordingly, where the spacecraft 104 is in an operational or mission phase in which an instrument 116 that is sensitive to metallic propellant is deployed, in use, and/or otherwise vulnerable to being adversely affected by the generation of thrust through the use of a metallic propellant 204, a non-metallic propellant 208 is supplied to the electric propulsion thruster 112 to generate thrust (step 412). Conversely if the command to generate thrust is received while the instrument 116 is stowed or otherwise protected, or if maintaining the performance of the instrument 116 is not of concern, a metallic propellant 204 can supplied to the electric propulsion thruster 112 to generate thrust (step 416). An example of a situation in which maintaining the performance of the instrument 116 is not of concern is where the thrust command is generated as part of a spacecraft 104 end of life mission phase or maneuver, for instance where the commanded thrust is intended to deorbit a spacecraft 104. At step 420, a determination is made as to whether operation of the propulsion system 108 should continue. If operation should continue, the process can return to step 404. Otherwise, the process can end.

Accordingly, embodiments of the present disclosure provide a propulsion system 108 incorporating one or more EP thrusters 112 that can be supplied with either a metallic 204 or a non-metallic 208 propellant. The operation of the propulsion system 108 can be controlled by a control system 120. As can be appreciated by one of skill in the art after consideration of the present disclosure, a propulsion system 108 in accordance with embodiments of the present disclosure can include a plurality of electric propulsion thrusters 112. Each included electric propulsion thruster 112 can itself include one or more outlets or nozzles oriented in various directions. A propulsion system 108 as disclosed herein can include multiple metallic propellant tanks 212 and/or multiple non-metallic propellant tanks 216 and associated valves and conduits. Methods in accordance with embodiments of the present disclosure can be performed through operation of a control system 120 executing stored and/or received instructions.

The foregoing description has been presented for purposes of illustration and description. Further, the description is not intended to limit the disclosed systems and methods to the forms disclosed herein. Consequently, variations and modifications commensurate with the above teachings, within the skill or knowledge of the relevant art, are within the scope of the present disclosure. The embodiments described hereinabove are further intended to explain the best mode presently known of practicing the disclosed systems and methods, and to enable others skilled in the art to utilize the disclosed systems and methods in such or in other embodiments and with various modifications required by the particular application or use. It is intended that the appended claims be construed to include alternative embodiments to the extent permitted by the prior art.

What is claimed is:

1. A propulsion system, comprising:
   an electric propulsion thruster;

a first storage tank, the first storage tank containing a metallic propellant;
a second storage tank, the second storage tank containing a non-metallic propellant;
a first metallic propellant supply valve, wherein the first metallic propellant supply valve can be operated to selectively provide metallic propellant from the first storage tank to the electric propulsion thruster and thereby generate thrust;
a first non-metallic propellant supply valve, wherein the first non-metallic propellant supply valve can be operated to selectively provide non-metallic propellant from the second storage tank to the electric propulsion thruster and thereby generate thrust; and
a control system, wherein the first metallic propellant supply valve is operated by the control system to supply metallic propellant to the electric propulsion thruster during an operational phase in which an instrument that is sensitive to the metallic propellant is not in a vulnerable state, and wherein the first non-metallic propellant supply valve is operated by the control system to supply non-metallic propellant to the electric propulsion thruster during an operational phase in which an instrument that is sensitive to the metallic propellant is in a vulnerable state.

2. The propulsion system of claim 1, further comprising:
a vaporizer, wherein the vaporizer is disposed between the first metallic propellant supply valve and the electric propulsion thruster.

3. The propulsion system of claim 2, further comprising:
a second metallic propellant supply valve disposed between the vaporizer and the electric propulsion thruster.

4. The propulsion system of claim 3, further comprising:
a regulator disposed between the first non-metallic propellant supply valve and the electric propulsion thruster.

5. The propulsion system of claim 4, further comprising:
a second non-metallic propellant supply valve disposed between the regulator and the electric propulsion thruster.

6. The propulsion system of claim 5, wherein the first storage tank is divided into first and second chambers, wherein the first chamber of the first storage tank contains the metallic propellant, and wherein the second chamber of the first storage tank is pressurized by the non-metallic propellant.

7. The propulsion system of claim 6, further comprising:
a pressurization supply regulator;
a pressurization supply valve between the second storage tank and the pressurization supply regulator; and
a backflow prevention valve between the pressurization supply regulator and the first storage tank, wherein non-metallic propellant in the second storage tank can be supplied to the second chamber of the first storage tank via the pressurization supply regulator by opening the pressurization supply valve and the backflow prevention valve.

8. The propulsion system of claim 1, wherein the metallic propellant is at least one of mercury, iodine, cesium and indium.

9. The propulsion system of claim 8, wherein the non-metallic propellant is at least one of krypton or xenon.

10. A spacecraft, comprising:
a propulsion system, including:
an electric propulsion thruster;
a first storage tank, wherein the first storage tank includes a metallic propellant;
a first supply valve, wherein the first supply valve is between an outlet of the first storage tank and the electric propulsion thruster;
a second storage tank, wherein the second storage tank includes a non-metallic propellant; and
a second supply valve, wherein the second supply valve is between an outlet of the second storage tank and the electric propulsion thruster;
a control system; and
an instrument, wherein the instrument is sensitive to the metallic propellant, wherein in a first mode of operation in which the instrument is not in a vulnerable state the control system is configured to operate the first supply valve to supply metallic propellant to the electric propulsion thruster, wherein in a second mode of operation in which the instrument is in a vulnerable state the control system is configured to operate the second supply valve to supply non-metallic propellant to the electric propulsion thruster, and wherein the control system is configured to operate no more than one of the first supply valve and the second supply valve to supply a respective propellant to the electric propulsion thruster at any one time.

11. The spacecraft of claim 10, wherein the propulsion system further includes:
a vaporizer, wherein the vaporizer is between the first supply valve and the electric propulsion thruster.

12. The spacecraft of claim 10, wherein the first storage tank includes a barrier that divides the first storage tank into a first volume that contains the metallic propellant, and a second volume that contains a pressurant.

13. The spacecraft of claim 12, wherein the propulsion system further comprises:
a pressurization supply valve, wherein the pressurization supply valve is operable to selectively supply the non-metallic propellant from the second storage tank to the second volume of the first storage tank as a pressurant.

14. A spacecraft propulsion method, comprising:
storing a metallic propellant in a first storage tank;
storing a non-metallic propellant in a second storage tank;
supplying at least a portion of the non-metallic propellant from the second storage tank to an electric propulsion thruster during a first spacecraft mission phase, wherein during the first spacecraft mission phase an instrument carried by the spacecraft that is sensitive to the metallic propellant is in a vulnerable state; and
supplying at least a portion of the metallic propellant from the first storage tank to the electric propulsion thruster during a second spacecraft mission phase, wherein during the second spacecraft mission phase the instrument carried by the spacecraft that is sensitive to the metallic propellant is not in a vulnerable state.

15. The method of claim 14, wherein the first spacecraft mission phase is an operational phase, and wherein the second spacecraft mission phase is an end of life phase.

16. The method of claim 14, further comprising:
supplying at least a portion of the non-metallic propellant to the first storage tank, wherein the non-metallic propellant pressurizes the metallic propellant in the first storage tank.

17. The method of claim 16, wherein the metallic propellant is at least one of mercury, cesium, iodine, and indium, and wherein the non-metallic propellant is at least one of krypton and xenon.

18. The method of claim 16, further comprising:
maintaining a physical separation between the metallic propellant in the first storage tank and the non-metallic propellant used to pressurize the metallic propellant.

19. The method of claim 14, wherein the first spacecraft mission phase includes operation or deployment of an optical instrument.

20. The method of claim 14, wherein supplying at least a portion of the metallic propellant from the first storage tank to the electric propulsion thruster includes operating a vaporizer to heat a section of conduit between the first storage tank and the electric propulsion thruster.

* * * * *